United States Patent [19]

Blum

[11] 4,345,818

[45] Aug. 24, 1982

[54] SOLAR DIODES

[76] Inventor: Alvin S. Blum, 2350 Del Mar Pl., Fort Lauderdale, Fla. 33301

[21] Appl. No.: 160,371

[22] Filed: Jun. 17, 1980

Related U.S. Application Data

[63] Continuation-in-part of Ser. No. 104,305, Dec. 13, 1979, abandoned.

[51] Int. Cl.³ .................... G02B 17/00; G02B 27/00
[52] U.S. Cl. .................................................. 350/259
[58] Field of Search ............................ 350/258–265; 126/417, 419, 428, 450

[56] References Cited

U.S. PATENT DOCUMENTS

| | | | |
|---|---|---|---|
| 3,488,505 | 1/1970 | Jentoft et al. | 350/258 X |
| 3,511,559 | 5/1970 | Foster | 350/258 |
| 3,936,157 | 2/1976 | Kapany | 350/258 |
| 4,126,379 | 11/1978 | Wu | 350/260 |
| 4,198,953 | 4/1980 | Power | 350/258 X |

Primary Examiner—Richard A. Wintercorn

[57] ABSTRACT

A system for utilizing solar radiation impinging upon exterior building surfaces for heating and lighting the interior while controlling energy loss and gain from the building comprising large area, thin radiation collecting means concentrating radiation onto narrow light guide means; light guide means for transmitting the radiation through exterior surfaces, insulation and the like to useful locations within the building and means at the terminus of the light guide for distributing the radiation. One embodiment forms a complete roofing system. Another embodiment forms an exterior wall treatment. Another embodiment provides improved solar heated greenhouses.

35 Claims, 13 Drawing Figures

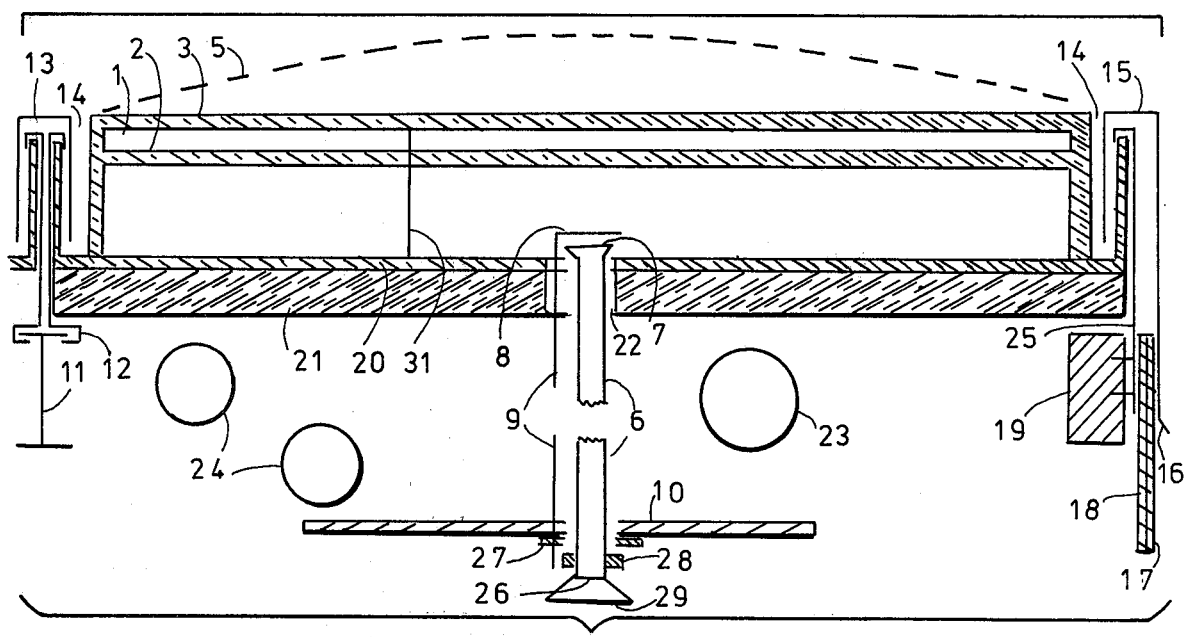
FIG.1
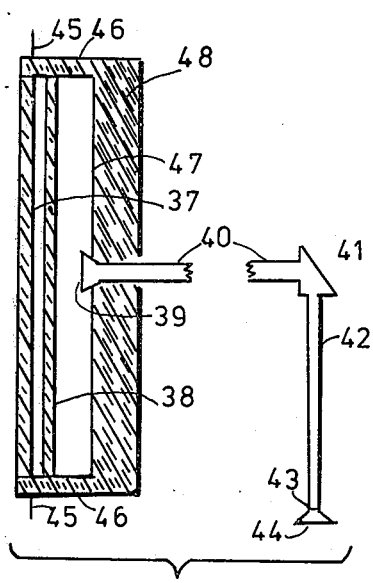
FIG.2
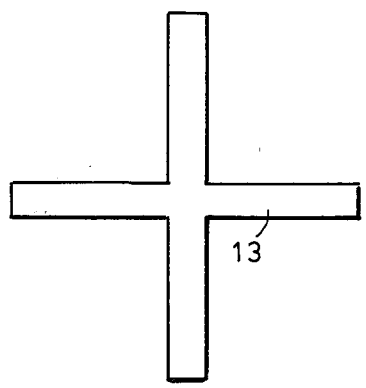
FIG.4
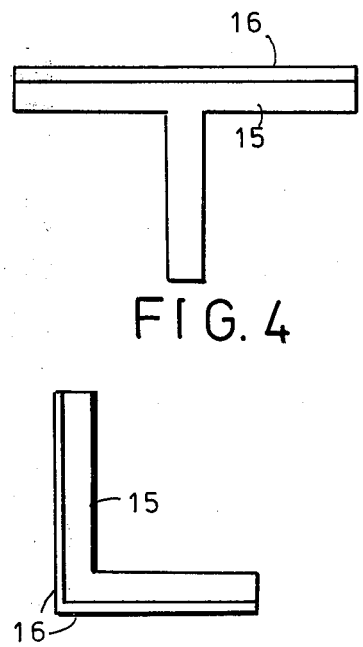
FIG.5
FIG.6
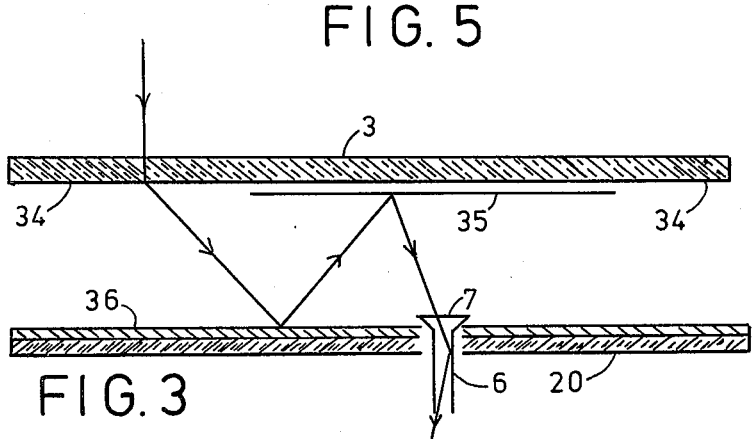
FIG.3

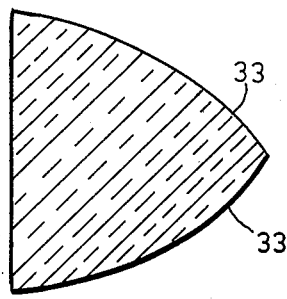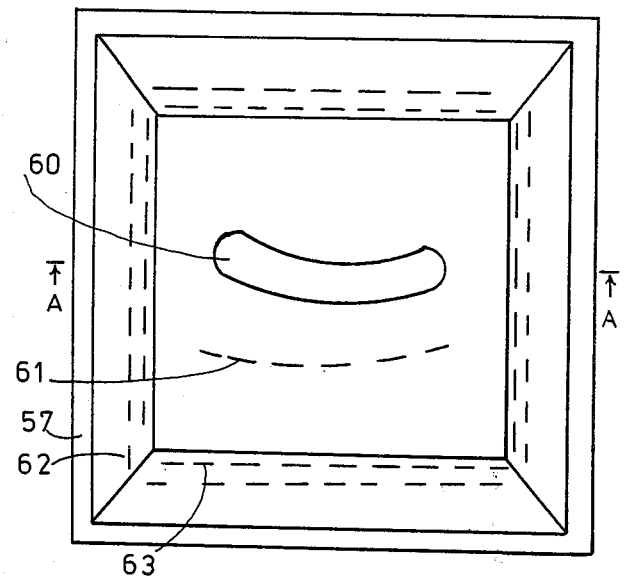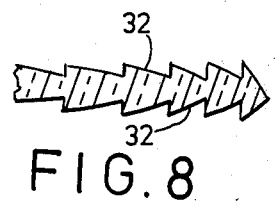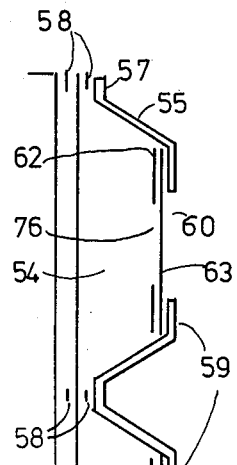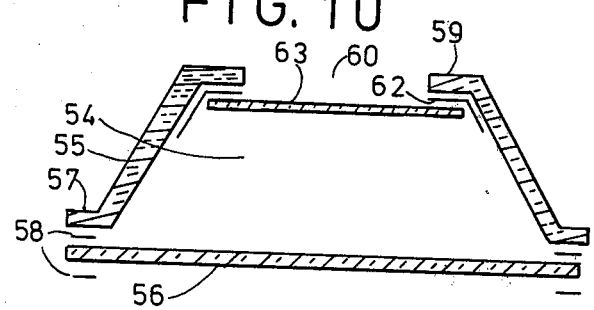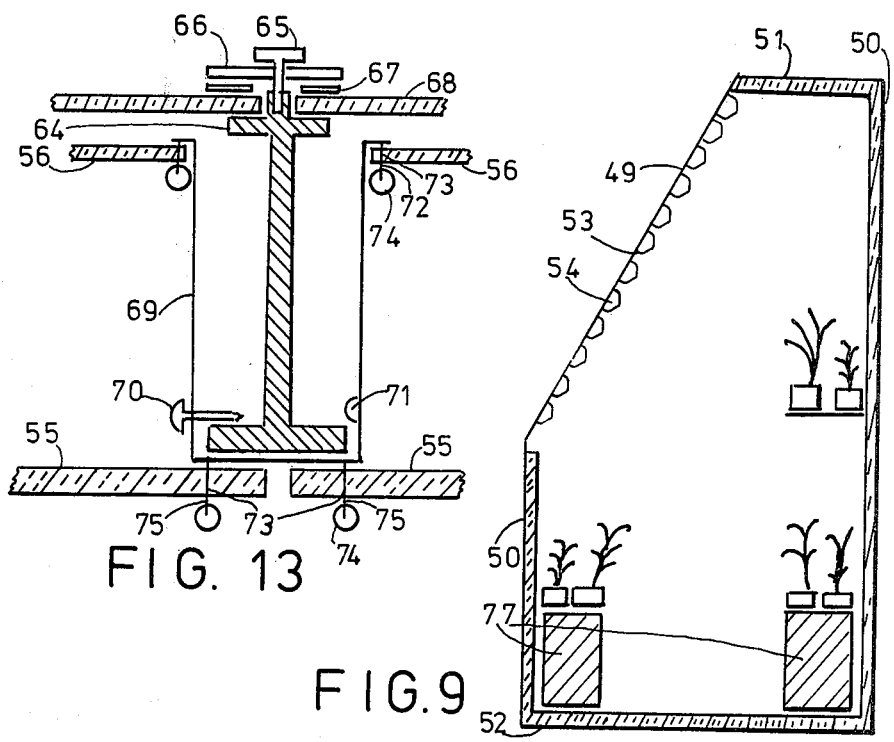

SOLAR DIODES

This is a continuation in part of application Ser. No. 06/104,305 filed Dec. 13, 1979, now abandoned.

BACKGROUND OF THE INVENTION

1. Field of the Invention

This invention relates to direct solar energy collecting, transmitting and distributing devices for illumination and heating of the interior of buildings without undesirable energy gain or loss from the building and without intermediate storage. Large flat collecting lens systems concentrate solar energy onto small light guides which traverse insulation and direct and distribute the energy to useful locations.

2. Description of the Prior Art

Windows and skylights bring the light and warmth of the sun into buildings. Even when special insulated glass is used, the energy loss from the interior is often greater than the energy required to illuminate artificially and heat gain or loss is poorly controlled by curtains.

Furthermore, much of the structural design of buildings is constrained by window placement requiring excessive exterior walls leading to greater initial cost, poor land use, and the burden of greater energy loss for the life of the building. Windows provide illumination from only one side of a room and not overhead as is usually desired. They cannot illuminate interior halls and rooms. Skylights are only useful for the top story. They provide better placement of illumination, but greater problems of heat loss and gain, preclude overhead insulation, ducts, pipes and wires and present moisture condensation problems. Known illuminating methods employing light guides or fiber optic bundles for transmitting light are well known in instrumentation such as endoscopes for observation within cavities, e.g. U.S. Pat. Nos. 4,017,150 and 3,600,568. They employ various configurations of conventional lenses adjacent a light source to focus light on a light guide and exit lenses to focus the transmitted light from the light guide onto the object being examined. The source is close to the concentrating lenses so that a substantial portion of the available light can be intercepted by a small diameter lens, and distance from first lens surface to light guide entrance is not critical. In our system, the light source, the sun, is distant and the energy is disperse. We must subtend a large area with our input lens to gather a useful amount of radiant energy. Distance from first lens surface to light guide entrance must be small relative to lens area (focal length) to allow a layer of insulation penetrated only by the light guide. Large diameter, ultra short focal length conventional lenses would be impossibly thick, heavy, and costly and would still protrude into the room from wall or ceiling, leaving no place for insulation. The present invention requires a large surface area concentrating lens arrangement with extremely short focal length that is also extremely thin so that it does not project substantially beyond the wall or roof surface where it might interfere with use of the room, placement of insulation, ducts, pipes, ceiling and the like.

Greenhouses are becoming uneconomic to operate for greater portions of the year because of increasing fuel costs to replace heat lost through glazing. Furthermore, a cost of operation has been application and removal of shading to reduce summer heat input. It is an object of the invention to provide inexpensive means to reduce heat loss in cold weather and reduce heat gain in summer.

SUMMARY OF THE PRESENT INVENTION

It is therefor a primary object of the present invention to provide devices to utilize directly the solar radiation impinging upon building surfaces for controlled heating and/or illumination within the building while preventing energy loss from the building. It is an object to provide means to allow certain solar energy to pass freely into the building while restricting passage of energy from the building, i.e., solar diodes. In accordance with the invention a device which achieves these objects includes: means for collecting solar energy from a large surface area, and condensing said energy to impinge upon the small area on the input end of light guide means by special thin lens means; narrow light guide means for transporting the energy through exterior building surfaces, insulation, walls and ceilings and the like; and means for dispersing said energy to useful locations within said building.

BRIEF DESCRIPTION OF THE DRAWINGS

Other objects and advantages of the present invention will become apparent from the following description taken in conjunction with the accompanying drawings, in which:

FIG. 1 is a sectional view of a roofing system embodying the invention with hollow light guide.

FIG. 2 is a sectional view of a wall element embodying the invention with fiber optic light guide.

FIG. 3 is a sectional detail of a roof element combining refracting and reflecting optics.

FIG. 4 is a plan view of an edge cover strip.

FIG. 5 is a plan view of a corner cover strip.

FIG. 6 is a plan view of a central cover strip for sealing the roof elements of FIG. 1.

FIG. 7 is a sectional detail of a conventional refracting condensing lens.

FIG. 8 is a sectional detail of a Fresnel type refracting condensing lens.

FIG. 9 is a cross section through a greenhouse.

FIG. 10 is a plan view of the invention for application to the glazing of a greenhouse.

FIG. 11 is a cross section through A—A of FIG. 10.

FIG. 12 is a cross section of another greenhouse embodiment.

FIG. 13 is a sectional detail of a glazing and support assembly for holding lens and insulation in place.

DETAILED DESCRIPTION OF THE PREFERRED EMBODIMENTS

FIG. 1 shows in cross section a complete roofing system embodying the invention and taking advantage of the physical properties of the large flat radiation collecting element to provide, in addition, an improved impermeable roof structure. Collector assemblies 1 may take, for example, the form of a two foot square with sealing troughs 14 at all four sides. The cavity formed by upper member 3 and troughs 14 is enclosed by bottom plate 20 which seals the cavity from moisture and dust and together with a plurality of vertical struts 31 stiffens the structure to support a greater load with less material in member 3. Plate 20 also supports and positions hollow light guide 6. Plate 20 may be metal coated to reduce heat penetration through insulation layer 21. Plate 20 and insulation layer 21 may be formed in combination by rigid foam. Assembly 1 rests upon roof joists 11 or exterior wall roof support beam 19. It is fastened thereto by holders 12 and 25 respectively which bend over and hold the upper edges of troughs 14. Water tightness between adjacent assemblies is provided by inside cover strip 13 which has an inverted U shaped cross with one leg in each trough 14. Edge cover strip 15 performs this function at the edge of the roof, where one leg fits into trough 14 and the other leg extends over exterior wall structure 18 and exterior wall surface 17 forming drip strip 16. FIG. 6 shows a plan view of inside cover strip 13 having legs long enough to overlap adjacent strips when in place. FIG. 4 shows a plan view of an edge cover strip 15 with outside edge 16 forming a drip strip. FIG. 5 shows a plan view of a corner cover strip 15 with two outside edges 16 forming drip strips.

Located immediately beneath upper member 3, center flat condensing lens 2 directs radiation passing through member 3 toward the flared inlet of light guide 6. A lens 7 covers over this inlet and directs condensed radiation down light guide 6 to bottom dispersing lens and cover 26. Radiation is further dispersed by diffusing lens 29 suspended below lens 26. Ceiling support grids 27 are held in place by collars 28 around light guide 6. Ceiling tile 10 rest upon grids 27. Because only the small diameter light guides hang down from the roof on two feet centers, ducts 23 and conduits 24 may be positioned with greater freedom. Lens means 2 may condense radiation eccentrically when required. When the system is to be used only for illumination, non useful radiation absorbing or reflecting means are incorporated into member 3 or lens 2 to prevent heat entering at lens 7. When these elements are transparent to said radiation so that the sun's heat may warm the building in winter, other means are provided to control heat influx in summer. Light guide may be located so that direct summer sun rays are not incident thereon. Shown here is movable element 8 which may be a filter which transmits only desired radiation or a reflector such as a gold coated mirror which reflects infra red and passes visible rays. This is moved over lens 7 in hot weather by control means 9 which may be automatic (bimetallic element) or a manual control. In a TV or film viewing room, an opaque element at 8 may further control visible light in the same manner. The upper flat surface 3 is suitable for pitched roofs. Where the roof is relatively horizontal, the upper surface may form a shallow dome 5 so that water and dirt will tend to move to the edges and interfere less with radiation transmission. Sealing compound at underside of cover strips 13 and 15 and in troughs 14 of FIG. 1 complete the water sealing. In a less expensive embodiment, the light guide may consist of a simple hole or shaped slot in plate 20.

Every effort is made to reduce the thickness of material through which radiation must pass, especially for heating use, since even partially transparent materials are so expensive and any radiation absorbed will not be available for use. In FIG. 1 the dome structure 5 and vertical struts 31 transfer forces to plate 20 which need not be transparent. It can be made thicker while upper member 3 or 5 can be made thinner. A conventional refracting collecting lens, a portion of which is shown in section in FIG. 7, would be so thick that it would absorb most of the infra red radiation. The weight and cost would preclude its use for a roofing system. Its shortest practical focal length would also be too great to fit into most over ceiling spaces. The instant invention employs for collecting lenses the stepped lens concept introduced by Buffon in 1748 and commonly called Fresnel lens, shown in section in FIG. 8. It is made up of zonal curved surfaces 32 of the same shape as curved surfaces 33 of conventional lens of FIG. 7 from which it is derived. The collection angle of such a lens is much greater than would be practicable for a solid lens. The individual steps or zones may be molded into a glass or plastic surface with present techniques in such detail that they are almost too fine to see. By using small steps a great depth of curvature of the lens may be achieved with a very thin structure, thereby reducing absorbtion losses and material costs. Referring now to FIG. 1, center collecting lens 2 may be a Fresnel lens of this type. It may be inexpensively formed from thin plastic sheet. The under surface of upper member 3 or 5 may form a Fresnel lens also. The lens 7 covering light guide 6 may also be of the Fresnel type. However it is of such small diameter that it may be feasible to use a conventional lens. Due to concentration of radiation, the lens 7 must be able to withstand high temperatures. The optimum shape of these lens surfaces may be different for parts of the roof having different angles to the sun or eccentric light guides. Optimisation of these lens elements is worthwhile, since they will then be formed in mass production by embossing, rolling, pressing, casting and the like from the master shape. In less costly embodiments, lens 7 may be absent, or may be a sheet of glass over a hole or slot in member 20.

The light guide 6 may take the form of a hollow tube with specular inner surface. Radiation directed down the tube by lens 7 which strikes the wall is returned to the tube by reflection. Such a light guide is especially useful for infra red radiation where a solid or fiber optic light guide transparent to such radiation may be prohibitive. Where the roof element is solely for visible light, a solid or fiber optic light guide may be used at 6. Lower lens and cover 26 and secondary dispersing lens 29 are of the diverging type to spread the radiation in the room below. They may also be of the Fresnel type. They may be combined with collar 28 in a detachable assembly that may be affixed to light guide 6 after it has been cut to size for the particular installation and ceiling support grid 27 put in place. Electric lamp means may be a part of this assembly, including means to regulate its power automatically according to solar radiation. Light guide 6 may be detachable from bottom support 20 for ease of shipping, fastening in place by insulation plug and lock 22. This would be especially useful when a long light guide is required to pass through a wall partition to illuminate a room below.

FIG. 3 shows details of a roof element combining reflecting and refracting optics. Peripheral annular region 34 of upper member 3 is a refracting condensing Fresnel lens by virtue of the stepped zones embossed on its under surface. Central portion 35 of upper member 3 is a condensing reflecting Fresnel mirror by virtue of specular coating on stepped zones embossed on its under surface. Upper surface 36 of plate 20 serves as a condensing reflecting Fresnel mirror by virtue of the specular coating on stepped zones embossed on its upper surface. Radiation passing through region 34 is bent centrally and impinges upon mirror 36 where it is reflected more centrally to mirror 35 which focuses the radiation upon lens 7 which directs radiation down light guide 6. This system reduces the amount of absorbing solid the radiation is required to traverse.

Refer now to FIG. 2 which shows in section a wall element embodying the invention. Outer impervious member 37 which may be glass, forms a portion of the exterior vertical wall of a building. It may be rectangular or circular, with sealing flanges 45 to seal to adjacent exterior surfaces for weather tightness. With interior plate 47 and edges 46 it encloses a space containing flat Fresnel condensing lens 38 and entrance lens 39 for horizontal light guide 40 which passes through insulation 48. Light guide 40 traverses over ceiling space to right angle reflecting prism 41 which directs radiation through vertical light guide 42 to exit and dispersing lens 43 and secondary dispersing lens 44 below ceiling. This application is less likely to be used for heating. It is more useful for illumination of a multistory building, providing the advantages of a conventional glass wall without its disadvantages. It may use a hollow or solid light guide. It may use a fiber optics light guide sufficiently flexible to be bent at a right angle, eliminating prism 41. Light guide 40 may pass beneath or through structures supporting upper stories. Windows require lintels to support structure over the unsupported area, whereas this wall element can be used with a solid wall having a small hole for passage of the light guide. Inner surface of outer member 37 may be embossed to form a Fresnel condensing lens. One or more inner Fresnel condensing lenses 38 may be formed from thin sheet material to further focus radiation upon entrance to light guide at lens 39.

FIG. 9 shows a cross section through a solar greenhouse of the type described by Fisher and Yanda in The Food and Heat Producing Solar Greenhouse.

Walls 50, roof 51, and floor 52 are insulated and single wall 49 is glazed. Wall 49 is so oriented as to be generally perpendicular to the noon sun rays in the coldest month. This construction and orientation maximizes solar energy input in cold months and minimizes internal heat loss. It also minimizes heat input in summer when the sun's rays come from a different direction. Water containers 77 serve as thermal reservoirs to store heat overnight. This arrangement extends the growing season into the cooler months and reduces the requirement for applying shading to the glazing for summer. However, the large glazed area continues to lose internal heat so that the system is only partially effective for colder climates and later in winter without considerable fuel expenditure. Application of modules 53 of the instant invention to the glazed area 49 serves to further reduce heat loss by effectively insulating the glazed wall 49 with a layer of insulation and a plurality of trapped air spaces 54. At the same time, there is little interference with the solar energy input in the cooler months. Advantage is taken of the great change in angle of the sun in summer to prevent the sun's rays from passing through the openings in the insulation by geometric means requiring no labor, materials or moving parts.

FIG. 10 is a plan view of an embodiment of the invention for direct application to glazing, and FIG. 11 is a cross sectional view through A—A of FIG. 10. Lower member 55 is formed of insulating material such as plastic foam, foam glass or the like. Upper member 56 fastens to rim 57 of lower member 55 with fastening means such as adhesive. Upper member 56 fastens to glazing or glazing support by fastening means 58 such as adhesive. Upper member 56 comprises a Fresnel type flat, generally converging lens. Upper member 56 fastens to lower member 57 by fastening means 58. The sun's rays pass through, and are focussed by the lens to a spot at the focal plane of the lens. Flat surface 59 which forms the bottom of lower member 55 is generally in this focal plane. It is at this plane that the smallest hole in the insulation will pass the sun's rays (the sun's image). The position of the sun's image in this plane will be determined by the time of year, time of day, latitude on earth, direction and angle of the glazing from the vertical. These data are available in Time Saver Standards, 14th Edition by Callender, McGraw Hill, an exerpt of which is appended. As the sun moves across the sky from east to west (azimuth) and higher and lower (altitude), the sun's image may trace an arc on flat surface 59. The shape and location of the arc changes throughout the seasons and is optimum when glazing faces a generally southerly direction. For glazing of a particular direction and angle from the vertical, one can generally cut a shaped slot 60 in flat surface 59 to pass the sun's image into the building in the cool months that will not pass the summer sun's image. Arc 61 represents the mid-summer sun's image path on surface 59. A thin sheet of metal 62 may dissipate and reflect the intense energy focussed thereon in summer. This may be essential with a thermally sensitive foam insulating material such as polystyrene, but not foam glass. A sheet of glass 63 may be provided to seal the air space 54 trapped between lens and insulation. A sealed air space reduces heat loss and condensation of moisture. The hole or arc in the insulation together with its glass plate and metal shield may be considered in effect the light guide in this embodiment. FIG. 12 shows another embodiment of the invention wherein a large span is covered by a single upper member 56 which is molded to comprise three Fresnel lenses in one sheet. Lower insulating member 55 is also formed into three separate chambers 54 each having a separate shaped slot 60 in lower surface 59 covered by an individual glass seal 63. In some situations it may be more desirable to cut an opening 60 in lower surface 59 large enough for many requirements. In that case, a slot 76 in the metal shield 62 may be cut to the correct shape and location for a particular situation. Adhesive means 58 fasten lower member 55 to lens 56 at multiple points. Glass seal 63 may have dispersive properties. FIG. 13 shows a cross section through a mullion or glazing bar 64 and support means for holding the elements of the invention in place thereto. Screw 65 clamps glazing strip 66 and gasket 67 against glazing 68 which is against mullion 64. To apply the invention to this structure, thin channel 69 is slipped over mullion 64 and held in place by screw 70 or indentation 71 or the like. Lens holding pin or tab 72 on channel 69 passes through perforation 73 in thin lens 56 and is closed by nut 74. Lower insulating member 55 is held on pin 75 at correct position and distance above lens 56 and held in place by nut 74. The lower member 55 may be a flat sheet with appropriate aperture. Pins 72 and 75 may be tabs punched out of the channel 69.

Inasmuch as the present invention is subject to many variations, modifications and changes in detail, it is intended that all matter described above or shown in the drawings be regarded as illustrative and not in a limiting sense.

What is claimed is:

1. A system for using solar radiation within a building while preventing undesirable energy exchange comprising: fixed relatively short focal length radiation concentrating means of thin cross section of the Fresnel type for concentrating said solar radiation, said concentrating means being of large area and forming part of the weatherproof roof or wall surface of said building or being enclosed beneath a transparent weatherproof roof or wall surface of said building; and small area light guide means for transmitting said concentrated radiation through building structure and/or insulation means of said building; and thereby directing and dispersing said radiation to useful locations within said building, the short focal length of said radiation concentrating means permitting installation of said system in wall or roof region of said building without occupying excessive internal volume of said building.

2. The invention of claim 1, wherein said radiation concentrating means includes at least one lens of the Fresnel type.

3. The invention of claim 1, wherein said radiation concentrating means includes at least one mirror of the Fresnel type.

4. The invention of claim 1, wherein said light guide means comprises hollow channel means having reflective internal surface means for transmission of radiation.

5. The invention of claim 1, wherein said light guide means comprises solid transparent rod means for transmission of radiation.

6. The invention of claim 1, wherein said light guide means comprises a plurality of transparent fibers for transmission of radiation.

7. The invention of claim 1, including lens means at the exit end of said light guide means to distribute said radiation to useful locations within said building.

8. The invention of claim 1 for a roofing system further comprising; weather sealing edge means; ceiling support means; insulation means; lamp support means; lamp regulation means; and radiation control means.

9. The invention of claim 1 for a wall element further comprising; weather sealing edge means; insulation means; angle reflecting means; and radiation control means.

10. The invention of claim 1 wherein radiation concentrating means includes a radiation transparent exterior surface member whose inner surface is embossed to form a converging Fresnel lens.

11. The invention of claim 1 wherein radiation concentrating means includes at least one radiation transparent member having at least one surface embossed to form a converging Fresnel lens.

12. The invention of claim 1 wherein radiation concentrating means includes at least one radiation reflecting surface embossed to form a converging mirror.

13. The invention of claim 1, further comprising interposable radiation control means for reflecting or absorbing certain radiation to prevent said certain radiation from entering the building at certain times.

14. The invention of claim 13, wherein said control means is actuated automatically by sensing means.

15. The invention of claim 1, further comprising electric lamp means, including automatic lamp power regulating means.

16. The invention of claim 1, wherein said light guide means comprises aperture means in said insulation means.

17. The invention of claim 16, wherein said aperture means is covered by transparent member means.

18. The invention of claim 16, wherein said aperture means is a slot means shaped and positioned to generally pass solar radiation in cool seasons of the year and to generally not pass solar radiation in summer.

19. The invention of claim 16, including metallic shield means to shield said insulation means from exposure to focussed solar radiation, said shield means having an aperture to pass said focussed solar radiation at appropriate times of the year.

20. The invention of claim 19, wherein said shield means generally obstructs the passage of focussed solar radiation in summer.

21. The invention of claim 18, wherein said slot means is generally at the focal plane of said focussing means.

22. The invention of claim 18, including: support means for supporting said focussing means; support means for supporting said insulation means; metallic shield means for shielding focussed radiation from said insulation means; and transparent plate means to cover said aperture means, wherein said support means provides fastening means to the structure of said building.

23. The invention of claim 22 wherein said support means provides spacing of said aperture means at or near the focal plane of said focussing means.

24. The invention of claim 22 wherein said insulation means is formed so as to space said aperture means at or near the focal plane of said focussing means.

25. The invention of claim 24 wherein said insulation means includes an edge or rim which fastens to said focussing means.

26. The invention of claim 18 comprising individual modules each including said focussing means sealed to said insulation means with said transparent plate means covering said aperture means to provide a closed air space further limiting heat transfer.

27. The invention of claim 26, wherein said aperture means is generally at or near the focal plane of said focussing means.

28. The invention of claim 27 including thermal shield means for shielding focussed radiation from said insulation means.

29. The invention of claim 28 wherein said focussing means provides a plurality of Fresnel type lenses and said insulation means provides a plurality of apertures to correspond to said lenses.

30. Apparatus for controlled input of solar energy into and heat energy out of a building comprising: solar radiation concentrating means of the Fresnel type for focussing solar radiation after it has impinged on large surface areas of said building onto smaller focal areas for transmission through aperture means in insulation means and heat insulation means having said aperture means to allow passage of said focussed solar radiation therethrough at certain times, said concentrating means being fixed and non tracking, of thin cross section and having relatively short focal length, and forming part of the weatherproof roof or wall surface of said building or being enclosed beneath a transparent weatherproof roof or wall surface of said building.

31. The invention of claim 30 comprising individual modules: wherein said radiation concentrating means comprises a thin transparent member whose surface has stepped elements forming a Fresnel converging lens; said insulation means is fastened to said lens at its periphery; said aperture means in said insulation means being generally at or near the focal plane of said lens; transparent plate means covering said aperture means to provide a closed air space to further impede heat transfer.

32. The invention of claim 31 including thermal shield means for shielding focussed radiation from said insulation means.

33. The invention of claim 31, including fastening means for fastening said modules directly to the interior of glazed building surfaces.

34. The invention of claim 30, wherein said radiation concentrating means comprises a plurality of individual thin transparent members whose surface has stepped elements to form a Fresnel refracting converging lens; a plurality of individual insulating members having said apertures therethrough; and support and spacing means for fastening said lenses and said insulating members to building structures so aligned that solar radiation passes through said lens and focusses on said aperture in said insulating member.

35. The invention of claim 30, wherein said aperture means is so positioned that the focus of direct sunlight does not pass through said aperture means during certain times.

* * * * *